United States Patent
Gupta (10) Patent No.: US 12,406,060 B2
(45) Date of Patent: Sep. 2, 2025

(54) AUTOMATED INTERPRETED APPLICATION CONTROL FOR WORKLOADS

(71) Applicant: Virsec Systems, Inc., San Jose, CA (US)

(72) Inventor: Satya V. Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 389 days.

(21) Appl. No.: 17/664,009

(22) Filed: May 18, 2022

(65) Prior Publication Data
US 2022/0391506 A1 Dec. 8, 2022

Related U.S. Application Data

(60) Provisional application No. 63/190,100, filed on May 18, 2021, provisional application No. 63/190,099, filed on May 18, 2021.

(51) Int. Cl.
*G06F 21/56* (2013.01)
*G06F 21/57* (2013.01)

(52) U.S. Cl.
CPC .......... *G06F 21/563* (2013.01); *G06F 21/562* (2013.01); *G06F 21/566* (2013.01); *G06F 21/577* (2013.01); *G06F 2221/033* (2013.01)

(58) Field of Classification Search
CPC .... G06F 21/562; G06F 21/566; G06F 21/577; G06F 2221/033; G06F 21/563
See application file for complete search history.

(56) References Cited

U.S. PATENT DOCUMENTS 6,321,334 B1 * 11/2001 Jerger .................... G06F 21/54 726/1
8,347,267 B2 1/2013 Givoni et al.
(Continued)

FOREIGN PATENT DOCUMENTS

WO 2015/007166 A1 1/2015
WO 2016/130372 A1 8/2016
(Continued)

OTHER PUBLICATIONS

Dizdar, A. , "Why are SAST solutions not always the best option for AST?", Bright, Jan. 22, 2020, 10 pages.
(Continued)

*Primary Examiner* — Paul E Callahan
(74) *Attorney, Agent, or Firm* — Hamilton, Brook, Smith & Reynolds, P.C.

(57) ABSTRACT

Embodiments provide functionality to protect computing workloads from script-based attacks. Upon receipt, at a workload, of a command to commence execution of code of a script, an embodiment determines whether (i) permissions of a user issuing the command comply with a permissions security standard, (ii) an identifier of an interpreter supporting the script is included in an approved interpreter list, (iii) an identifier of a selected parameter of the interpreter is included in an approved parameter list, and (iv) an identifier of the script is included in an approved list of executables. If all of the aforementioned checks pass, such an embodiment allows execution of the code of the script; otherwise, execution is denied, thereby protecting the workload in an event of a script-based attack.

20 Claims, 8 Drawing Sheets

(56) References Cited

U.S. PATENT DOCUMENTS

| | | | |
|---|---|---|---|
| 9,246,935 | B2 | 1/2016 | Lietz et al. |
| 9,374,390 | B1* | 6/2016 | Teal ..................... G06F 21/554 |
| 9,418,230 | B2 | 8/2016 | Archer et al. |
| 9,501,650 | B2 | 11/2016 | Chess et al. |
| 9,578,060 | B1 | 2/2017 | Brisebois et al. |
| 9,589,560 | B1 | 3/2017 | Vitaladevuni et al. |
| 10,116,681 | B2 | 10/2018 | Cornell et al. |
| 10,354,074 | B2 | 7/2019 | Gupta |
| 10,387,659 | B1 | 8/2019 | Youngberg et al. |
| 10,395,041 | B1 | 8/2019 | Youngberg et al. |
| 10,447,730 | B2 | 10/2019 | Gupta |
| 10,467,419 | B1 | 11/2019 | Youngberg et al. |
| 10,963,565 | B1 | 3/2021 | Xu et al. |
| 11,615,061 | B1 | 3/2023 | Malik et al. |
| 11,907,378 | B2 | 2/2024 | Gupta |
| 12,158,958 | B2 | 12/2024 | Gupta et al. |
| 12,282,552 | B2 | 4/2025 | Gupta |
| 2003/0074207 | A1 | 4/2003 | Pace et al. |
| 2004/0046785 | A1 | 3/2004 | Keller |
| 2005/0102534 | A1* | 5/2005 | Wong .................... G06F 21/577 726/4 |
| 2007/0199000 | A1* | 8/2007 | Shekhel ................. G06F 9/468 719/330 |
| 2008/0052527 | A1 | 2/2008 | Siedlarz |
| 2009/0119769 | A1 | 5/2009 | Ross et al. |
| 2013/0111595 | A1 | 5/2013 | Amit et al. |
| 2014/0082735 | A1 | 3/2014 | Beskrovny et al. |
| 2014/0082739 | A1 | 3/2014 | Chess et al. |
| 2014/0165192 | A1 | 6/2014 | Zhu et al. |
| 2015/0215332 | A1 | 7/2015 | Curcic et al. |
| 2015/0261653 | A1 | 9/2015 | Lachambre et al. |
| 2015/0309813 | A1 | 10/2015 | Patel |
| 2016/0164891 | A1 | 6/2016 | Satish et al. |
| 2016/0241582 | A1 | 8/2016 | Boia et al. |
| 2017/0270303 | A1 | 9/2017 | Roichman et al. |
| 2017/0288878 | A1 | 10/2017 | Lee et al. |
| 2017/0353434 | A1 | 12/2017 | Al-Saber et al. |
| 2018/0349602 | A1 | 12/2018 | Johns |
| 2019/0138725 | A1 | 5/2019 | Gupta |
| 2019/0286833 | A1 | 9/2019 | Takumi et al. |
| 2019/0377877 | A1 | 12/2019 | Johns |
| 2020/0004963 | A1 | 1/2020 | Zheng et al. |
| 2020/0042714 | A1 | 2/2020 | Gupta |
| 2020/0065166 | A1 | 2/2020 | Myneni et al. |
| 2020/0097662 | A1 | 3/2020 | Hufsmith et al. |
| 2020/0134193 | A1 | 4/2020 | Youngberg et al. |
| 2020/0134194 | A1 | 4/2020 | Youngberg et al. |
| 2020/0134195 | A1 | 4/2020 | Youngberg et al. |
| 2020/0167477 | A1 | 5/2020 | Ionescu et al. |
| 2020/0336507 | A1 | 10/2020 | Lee et al. |
| 2021/0086089 | A1 | 3/2021 | Pardeshi et al. |
| 2021/0099483 | A1 | 4/2021 | Shukla |
| 2021/0160273 | A1 | 5/2021 | Choi et al. |
| 2022/0046031 | A1 | 2/2022 | Kaidi |
| 2022/0067174 | A1 | 3/2022 | Gupta |
| 2022/0147635 | A1 | 5/2022 | Copty et al. |
| 2022/0198025 | A1 | 6/2022 | Gupta et al. |
| 2022/0207151 | A1 | 6/2022 | Gupta |
| 2022/0210180 | A1 | 6/2022 | Gupta |
| 2022/0214928 | A1 | 7/2022 | Gupta et al. |
| 2023/0004652 | A1 | 1/2023 | Gupta |
| 2025/0068726 | A1 | 2/2025 | Gupta et al. |

FOREIGN PATENT DOCUMENTS

| | | |
|---|---|---|
| WO | 2020/026228 A1 | 2/2020 |
| WO | 2022/047245 A1 | 3/2022 |
| WO | 2022/147474 A1 | 7/2022 |
| WO | 2022/147478 A1 | 7/2022 |
| WO | 2022/155685 A1 | 7/2022 |
| WO | 2022/155687 A1 | 7/2022 |
| WO | 2022/246436 A1 | 11/2022 |
| WO | 2022/246437 A1 | 11/2022 |
| WO | 2023/133586 A1 | 7/2023 |

OTHER PUBLICATIONS

Horvath, M., et al., "Magic Quadrant for Application Security Testing" Gartner Reprint, (33 pages) Apr. 29, 2020, 33 pages, retrieved from https://www.gartner.com/doc/reprints?id=1-1YWZKUB5&ct=200429&st=sb.

Potdar, S., "The Curious Case of False Positives in Application Security", Security Zone, May 13, 2019, 4 pages.

QwietAI "ShiftLeft Achieves Highest Ever SAST Score on OWASP Benchmark", Nov. 1, 2023, 7 pages, retrieved from https://qwiet.ai/news-press/shiftleft-achieves-highest-ever-sast-score-on-owasp-benchmark/.

"ATT&CK (Registered)", The Mitre, Available online at: <https://attack.mitre.org>, Sep. 14, 2023, 1 page.

"CAPEC—Common Attack Pattern Enumeration and Classification", (CAPEC(Trademark)), Available on https://capec.mitre.org, Jan. 2, 2022, 2 pages.

"CAPEC View: Mechanisms of Attack", View ID: 1000, (Version 3.6), Available online https://capec.mitre.org/data/definitions/1000.html, Jan. 2, 2022, 2 pages.

"Configuration Management Database (CMDB)", 2023, 15 pages.

"CWE View: Software Development" View ID: 699, Individual Dictionary Definition (4.6), Available on https://cwe.mitre.org/data/definitions/699.html, Jan. 2, 2022, 2 pages.

"Integrated Risk Management (IRM)", Gartner Glossary, Available on https://www.gartner.com/en/information-technology/glossary/integrated-risk-management-irm, Jan. 2, 2022, 5 pages.

"javap—The Java Class File Disassembler", Oracle, Java SE Documentation, Available on https://docs.oracle.com/javase/7/docs/technotes/tools/windows/javap.html, Jan. 2, 2022, 3 pages.

"The Shadow Brokers", Wikipedia, Available on https://en.wikipedia.org/wiki/The_Shadow_Brokers, Jan. 2, 2022, 8 pages.

"Welcome to YARA's documentation-yara 4.3.2 documentation" Available online at: <https://yara.readthedocs.io/en/stable/>, retrieved on Sep. 14, 2023, 4 pages.

"Windows Print Spooler Remote Code Execution Vulnerability", Security Vulnerability, CVE-2021-34527, Available on https://msrc.microsoft.com/update-guide/vulnerability/CVE-2021-34527#title, Jun. 13, 2023, 1 page.

Caputo, D., et al: "Droids in Disarray: Detecting Frame Confusion in Hybrid Android Apps", Jun. 11, 2019 (Jun. 11, 2019), Advances in Databases and Information Systems; [Lecture Notes in Computer Science; Lect.Notes Computer], Springer International Publishing, Cham, pp. 121-139.

Chen et al., "Automated system change discovery and management in the cloud", IBM Journal of Research and Development, vol. 60, No. 2-3, Mar. 1, 2016, pp. 2:1-2:10.

Chen et al., "Detecting and Identifying System Changes in the Cloud via Discovery by Example", 2014 IEEE International Conference on Big Data, Oct. 27, 2014, pp. 90-99.

Chen, Lu., et al., "Research on Mobile Application Local Denial of Service Vulnerability Detection Technology Basec on Rule Matching", 2019 IEEE International Conference On Energy Internet (ICEI), IEEE, May 27, 2019 (May 27, 2019), pp. 585-590.

David Stahl, "What's an RFC and what can they do for me?", Global Knowledge, Available on https://www.globalknowledge.com/us-en/resources/resource-library/articles/whats-an-rfc-and-what-can-they-do-for-me/, Sep. 16, 2009, 2 pages.

International Search Report and Written Opinion received for PCT Patent Application No. PCT/US2021/048077, mailed on Dec. 20, 2021, 11 pages.

International Search Report and Written Opinion received for PCT Patent Application No. PCT/US2021/073197, mailed on Mar. 21, 2022, 10 pages.

International Search Report and Written Opinion received for PCT Patent Application No. PCT/US2021/073201, mailed on Apr. 7, 2022, 10 pages.

International Search Report and Written Opinion received for PCT Patent Application No. PCT/US2022/070236, mailed on Apr. 8, 2022, 15 pages.

(56) References Cited

OTHER PUBLICATIONS

International Search Report and Written Opinion received for PCT Patent Application No. PCT/US2022/070240, mailed on Apr. 7, 2022, 17 pages.

International Search Report and Written Opinion received for PCT Patent Application No. PCT/US2022/072416, mailed on Sep. 8, 2022, 13 pages.

International Search Report and Written Opinion received for PCT Patent Application No. PCT/US2022/072417, mailed on Sep. 8, 2022, 15 pages.

Johns, M., et al., "XSSDS: Server-Side Detection of Cross-Site Scripting Attacks", Computer Security Applications Conference, 2008. Acsac, Dec. 8, 2008, pp. 335-344.

Koutroumpouchos, K., et al., "ObjectMap: detecting insecure object deserialization", PCI '19: Proceedings of the 23rd Pan-Hellenic Conference on Informatics, Nov. 28, 2019, pp. 67-72.

Prevelakis et al., "Sandboxing Applications", USENIX, The Advanced Computing Systems Association, Feb. 25, 2019, pp. 1-9.

Secure execution of privileged scripts ED-Darl Kuhn, IP.Com, IP.Com Inc., West Henrietta, Sep. 18, 2009, XP013134389.

Sun, F., et al., "Client-Side Detection of XSS Worms by Monitoring Payload Propagation", Advances In Databases And Information Systems, Sep. 21, 2009, pp. 539-554.

Xia, M. et al: "Effective Real-Time Android Application Auditing", 2015 IEEE Symposium On Security and Privacy, IEEE, May 17, 2015 (May 17, 2015), pp. 899-914.

International Search Report and Written Opinion received for PCT Patent Application No. PCT/US2023/060379, mailed on Apr. 19, 2023, 15 pages.

Yang Ji, "Efficient and refinable attack investigation," A Dissertation Presented to The Academic Faculty, Georgia Institute of Technology, Dec. 2019, pp. 123.

\* cited by examiner

AUTOMATED INTERPRETED APPLICATION CONTROL FOR WORKLOADS

RELATED APPLICATIONS

This application claims the benefit of U.S. Provisional Application No. 63/190,099, filed on May 18, 2021, and U.S. Provisional Application No. 63/190,100, filed on May 18, 2021. The entire teachings of the above applications are incorporated herein by reference.

BACKGROUND

Workloads utilize various computing resources to load and execute appropriate software instructions so as to accomplish user desired tasks. Workloads may be deployed across a network of an organization such as an enterprise, and may feature, for example, various versions of sets of software instructions.

Cyber-attacks inflicted upon such workloads are becoming increasingly sophisticated. Attacks are often targeted to exploit specific vulnerabilities. Various methods and tools exist for identifying these vulnerabilities, but these existing methods and tools are inadequate.

SUMMARY

Embodiments provide functionality to protect computing workloads from script-based attacks.

This disclosure provides a method where a workload receives a command to commence execution of code of a script. The method determines whether (i) permissions of a user issuing the command comply with a permissions security standard, (ii) an identifier of an interpreter supporting the script is included in an approved interpreter list, (iii) an identifier of a selected parameter of the interpreter is included in an approved parameter list, and (iv) an identifier of the script is included in an approved list of executables. The method protects the workload from script-based attacks by allowing or denying the execution of the code of the script based on the determining.

A permissions security standard, for example, in Linux, may specify that the user issuing the command must have ownership permission of the script, or at least membership of a user group associated with the script, in order for execution of code of the script to be allowed. Such a security standard may prevent a user from relying on the permission of "others," i.e., non-owners and non-group-members associated with the script, in order to run code of the script. Embodiments may utilize any desired permissions security standard. An approved interpreter list may include multiple levels of granularity, such as by considering specific versions of noted interpreters. The selected parameter under consideration may be included in the command, and may serve to modify operations performed by the interpreter as provided by a developer of the interpreter and as desired by the user. Such parameters may alternatively be referred to as command line switches, or simply as switches. At least one of the identifier of the interpreter, the identifier of the selected parameter, and the identifier of the script may include a checksum or another measure/indication of script integrity. In an example embodiment, all such interpreter switches/parameters are checked to determine if the selected parameters comply with user/enterprise requirements.

The method may include receiving an identifier of an approved interpreter, or parameter thereof, from a vendor of the approved interpreter, and adding the identifier of the approved interpreter, or parameter thereof to the approved interpreter list, or the approved parameter list. Alternatively, or in addition, the method may include receiving an identifier of an approved script from a vendor of the approved script, and adding the identifier of the approved script to the approved list of executables.

Allowing or denying the execution of the code of the script may include denying the execution of the code of the script in response to the received command not being present in a list of commands known to be used by the workload at runtime. Allowing or denying the execution of the code of the script may be further based on determining whether the user is positively authorized to execute the script based on permissions of the user and permissions of the script. Further still, allowing or denying the execution of the code of the script may include denying the execution of the code of the script in response to a process to be spawned by the script matching a process in a list of known malicious processes. Allowing or denying the execution of the code of the script may further include denying the execution of the code of the script in response to at least one of the script, a process to be spawned by the script, and a library to be loaded during the execution of the script, including a known vulnerability.

In some implementations, in response to allowing the execution of the code of the script, the method intercepts a given process spawned during the execution of the code of the script, tokenizes the received command, compares tokens of the tokenized received command with entries in an allow-list database, and, based on the comparing, maintains the execution, or suspends the execution, of the code of the script, or indicates a result of the comparing to a user seeking to control execution of the script.

In response to allowing the execution of the code of the script, the method may include intercepting a library loaded during the execution of the script. In such an implementation, in response to the library including a known vulnerability, and a disposition of the library regarding the vulnerability having not been received from a user, the method further includes suspending the execution of the code of the script, or indicates the vulnerability to a user seeking to control execution of the script.

Another aspect of the disclosure is directed to a system for protecting a computing workload from script-based attacks. The system includes an application control policy (ACP) engine and an endpoint process monitoring client (EPMC). The EPMC may be configured to intercept a command to commence execution of code of a script. The ACP engine may be configured to determine, in response to the interception of the command by the EPMC, whether (i) permissions of a user issuing the command comply with a permissions security standard, (ii) an identifier of an interpreter supporting the script is included in an approved interpreter list, (iii) an identifier of a selected parameter of the interpreter is included in an approved parameter list, and (iv) an identifier of the script is included in an approved list of executables. The ACP engine may be further configured to allow or deny the execution of the code of the script based on the determining, thereby protecting the workload from script-based attacks.

Yet another aspect of the disclosure is directed to a computer program product for protecting a computing workload from script-based attacks. The computer program product includes one or more non-transitory computer-readable storage devices and program instructions stored on at least one of the one or more storage devices. The program instructions, when loaded and executed by a processor, cause the processor to protect a computing workload from script-based attacks as described herein.

It is noted that embodiments of the method, system, and computer program product may be configured to implement any embodiments described herein.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Cyber-attackers have started graduating from unleashing file-based, compiled malware to relying on file-less, script-based malware. This newer type of malware executes within context of an executable, such as an interpreter, that is already present on a computing workload. This type of script-based attack may also be referred to as a "living off the land" type of attack, due to a dual-use nature of interpreters provided as part of an operating system installation or distribution. Such a dual-use nature permits these interpreters to be used by information technology personnel of an enterprise for legitimate activities, but also leaves such interpreters vulnerable to use by attackers for nefarious purposes. As interpreters thus used illicitly are otherwise considered legal in and of themselves, it is important to examine the manner in which such interpreters are used, as described herein.

Many existing file reputation engines classify malware based on a signature such as a checksum of an executable. This checksum is relatively immutable. Cybersecurity providers promoting these types of engines claim they have acquired signatures of billions of malware manifestations through research from numerous anti-virus vendors. When an end-user of such a file reputation engine uploads either a given piece of malware or its checksum, the file reputation engine responds with the name of the piece of malware and a score indicating how many different antivirus engines correctly identify that piece of malware.

File reputation engines such as these use a rules engine, e.g., a YARA rules engine (available at https://yara.readthedocs.io/en/stable/), which relies on a database of strings that are embedded in the executable associated with the named piece of malware. These strings can be of the following types:

a) Hexadecimal strings
b) Text strings (e.g., case insensitive strings, wide character strings, XOR strings, base-64 strings, full word strings, etc.)
c) Regular expressions
d) Private strings Unfortunately, existing file reputation engines are nearly helpless against file-less, or script-based malware. Many bad actors take advantage of this fact to first exploit a vulnerability in a workload and then establish a connection, such as a reverse shell, to their command control server. Attackers can then send more script-based malware through the established connection, while evading detection on a persistent basis.

The foregoing factors undermine the risk posture of an enterprise. Embodiments described herein address the abovementioned shortcomings and allow users to block bad actors from exploiting vulnerabilities and launching script-based attacks using web shells or similar tactics. Many such tactics, from which embodiments offer protection, are disclosed in MITRE's ATT&CK framework (available at https://attack.mitre.org/).

Legacy And Cloud Native Applications

Enterprises have been slowly migrating from legacy or monolith applications to cloud native or microservices-based applications. As the name suggests, instead of deploying a large monolith application, users of microservices-based applications can disaggregate the overall functionality of a monolith application into smaller, but modular chunks. This disaggregation allows microservices-based applications to be upgraded and patched without deploying the full application all over again. Another advantage of microservices-based applications is that a hot microservice can scale independently of the other microservices that are not invoked as much. Scaling the entire monolith application is also not desirable.

Figure 1:
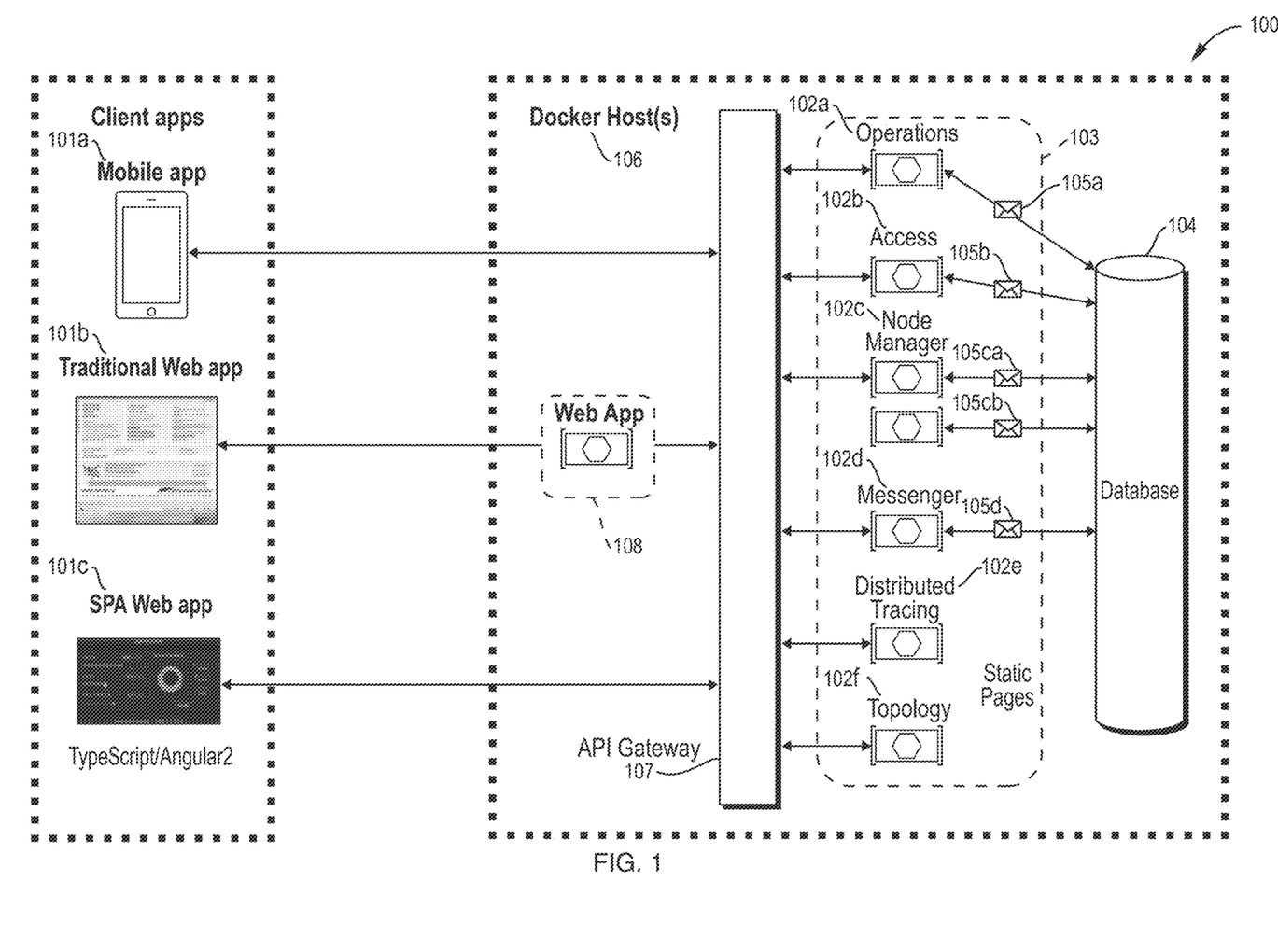
FIG. 1 is a block diagram illustrating a legacy or monolith service web application that may be analyzed using embodiments.

A legacy, i.e., monolith, application 100 is represented in FIG. 1. In this monolith application 100 represented in FIG. 1, all individual functionality (operations 102a, access 102b, node manager 102c, messenger 102d, distributed tracing 102e, and topology 102f) is packaged in one monolith workload 103. This common functionality 102a-f shares a local or remote common database 104 workload as well. As such, each individual function 102a-d sends respective data 105a, 105b, 105ca, 105cb, and 105d to the common database 104. Intercommunication between discrete functionality 102a-d in the monolith application 100 is typically performed via a very fast inter-process communication (IPC) mechanism such as shared memory or pipes/fifos. This is possible since the entire functionality 102a-f of the workload 103 lives on one host 106.

In operation, the application 100 is accessed by the client applications which include a mobile application 101a, traditional web application 101b, and single-page web application 101c. The mobile application 101a and single-page web application 101c access the functionality 102a-f of the application 100 via the application programming interface (API) gateway 107. The traditional web application 101b accesses the application 100 via the web application service 108 and API gateway 107.

The monolith application 100 runs on top of operating system (OS) provided runtime processes and services. In addition, the application 100 may leverage third party binary and interpreted code (executables and libraries) as well as first party code (executables and libraries). All this code, i.e., third party binary code, third party interpreted code, and first party code, may contain vulnerabilities, some of which are known, and others that may be latent or unknown at a given moment in time.

Figure 2:
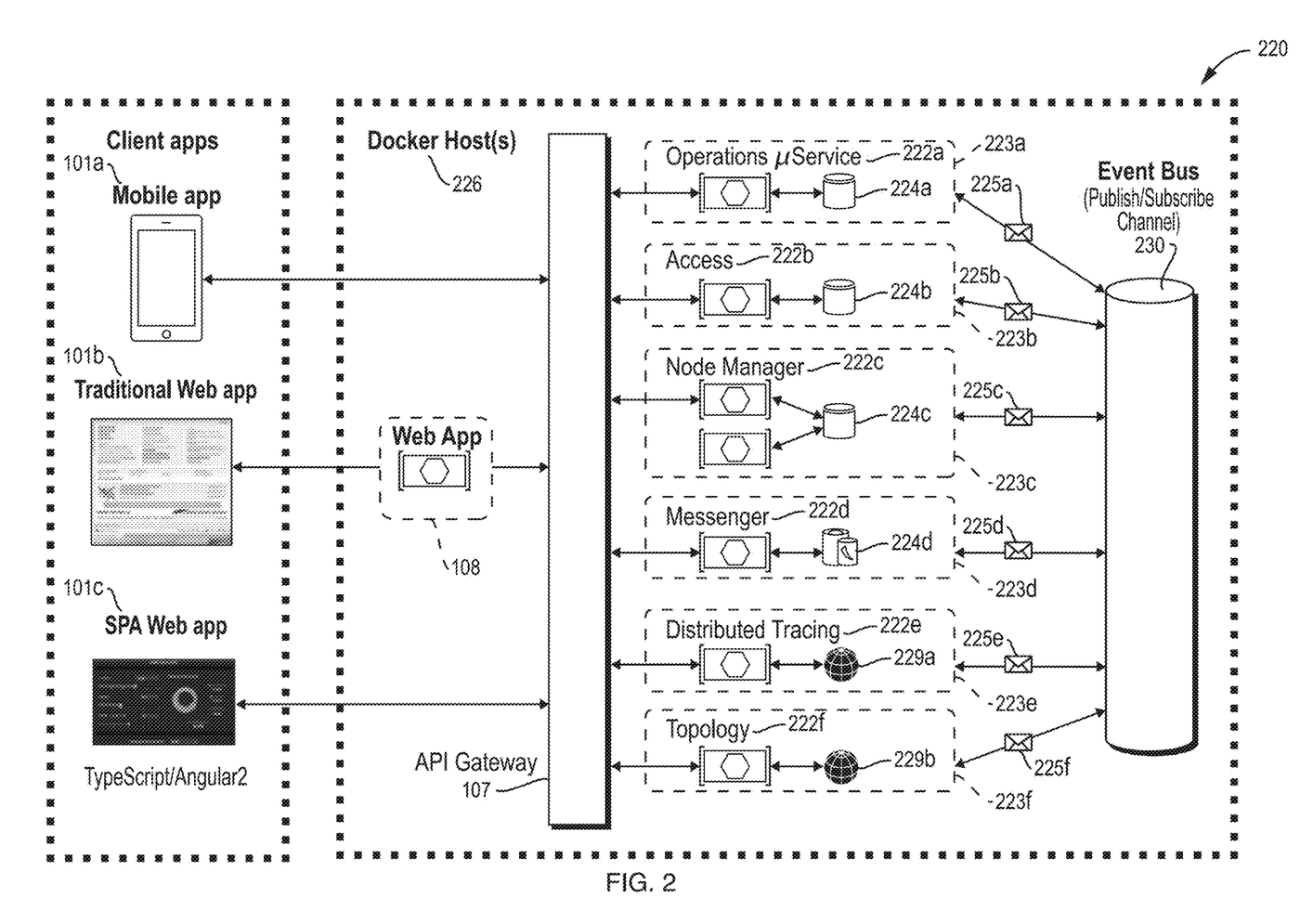
FIG. 2 is a block diagram illustrating a cloud native or microservice web application that may be analyzed using embodiments.

The application 100 can be delivered as a microservices-based application. FIG. 2 illustrates an example application 220, which is a microservices-based version of the application 100. As can be seen, the functionality 102*a-f* of the monolith application 100 is broken into individual services 222*a-f* (i.e., containers) with individual databases 224*a-d* and web connections 229*a-b*. Such web connections 229*a-b* may permit a service 222*e-f* to forward a request to a remote database or to another service via the Internet or other such network connection. Each functionality 223*a-f* can live on one or more host 226 or workload 223*a-f*. The communication between individual microservices 222*a-f* is via messages 225*a-f* that are brokered by an event bus 230. Individual user transactions weave through one or more microservices 222*a-f*, and when the full transaction is completed successfully, each service involved in the transaction synchronizes its respective database 224*a-d* atomically. Conversely, if the transaction fails, changes to the individual databases 224*a-d* are not committed.

Similar to the application 100, in operation the application 220 is accessed by the client applications, which include a mobile application 101*a*, traditional web application 101*b*, and single-page web application 101*c*. The mobile application 101*a* and single-page web application 101*c* access the functionality 222*a-f* of the application 220 via the application programming interface (API) gateway 107. The traditional web application 101*b* accesses the application 220 via the web application service 108 and API gateway 107.

How to Evaluate Cyber Risk of an Application

Software infrastructure, e.g., the software infrastructure utilized by an organization, can be visualized as being segmented at different tiers such as on a per business unit basis, per application within that business unit, per private/public cloud provider or data center. The application's infrastructure may further be segmented based on a location within the data center and a subnet in said data center. Workloads themselves can be individual workloads or a high-availability or load balanced cluster of identical workloads.

Figure 3:
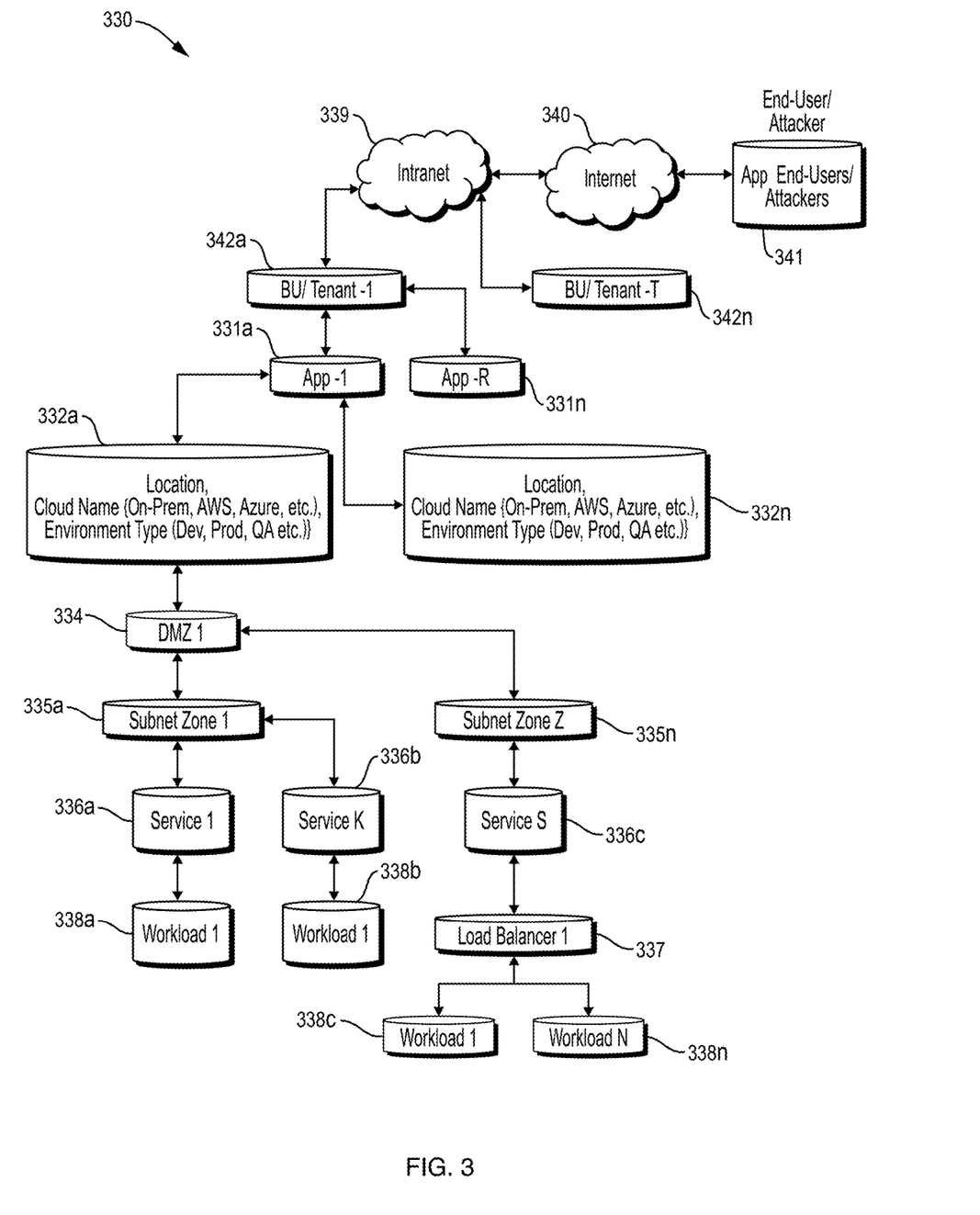
FIG. 3 is a schematic block diagram representation of an example software infrastructure subject to embodiments.

An example of such a visualization is shown in FIG. 3. Particularly, FIG. 3 illustrates software application infrastructure environment 330 of an enterprise in which embodiments for protecting a computing workload from script-based attacks, as described herein, may be employed.

In the environment 330, a workload may include a monolith (e.g., 100) or microservices-based (e.g. 220) software application. Such an application may be installed at additional workloads deployed across a network.

In FIG. 3, applications 331*a* and 331*n*, locations 332*a* and 332*n*, de-militarized zone (DMZ) 334, subnet zone 335*a* and subnet zone 335*n*, services 336*a-c*, load balancer 337, and workloads 338*a*, 338*b*, 338*c*, and 338*n* represent network topology of an aspect of the workloads 338*a*, 338*b*, 338*c*, and 338*n*, such as an application. Depicted in the lowest layer of the network topology are individual workloads 338*a*, 338*b*, 338*c*, and 338*n* that provide the application functionality. Such individual workloads 338*a*, 338*b*, 338*c*, and 338*n* may comprise three layers, including an infrastructure layer, a virtualization layer, and a service layer as described hereinbelow in relation to FIG. 4. In such an embodiment, code used within a given workload 338*a*, 338*b*, 338*c*, and 338*n* can be resident in either the file system or in memory. The network environment 330 may include an intranet 339 connected to the Internet 340 and as such may be accessed by an end-user 341. In some cases, the end-user 341 may be a malicious attacker.

Continuing with respect to FIG. 3, deployed upon the intranet 339 is business logic for respective business units, which may include a first business unit 342*a* and other business units up to and including a Tth business unit 342*n*. Such business units 342*a* and 342*n* may also be referred to as tenants. Within the business logic for the business units 342*a*, 342*n* are software applications 331*a*, 331*n*. While only a first application 331*a* and second application 331*n* are depicted, the business units 342*a* and 342*n* may utilize any number of applications. Each such application 331*a*, 331*n* is deployed on at least one location 332*a*, 332*n*, which may be a cloud location, on premises location, or other such location known in the art. Within the locations 331*a*, 331*n* is deployed a DMZ 334, beyond which are deployed at least one subnet from a first subnet zone 335*a* to a Zth subnet zone 335*n*. Various services 336*a-c* are deployed within the subnets 335*a*, 335*n*. In particular, services 336*a* and 336*b* are deployed on subnet zone 335*a* and service 336*c* is deployed on subnet zone 335*n*. Within each service 336*a-c*, are deployed workloads 338*a-n*. The service 336*a* is implemented using the workload 338*a* and the service 336*b* is implemented using the workload 338*b*. Likewise, the service 336*c* is deployed using both the workloads 338*c* and 338*n* and the load balancer 337. Upon each workload 338*a-n*, one or more application service instance (not shown) may be deployed. Each application service instance includes an infrastructure hardware layer, a virtualization layer, and a service, which may include operating system runtime packages, compatible precompiled binary packages, and compatible byte code packages.

Figure 4:
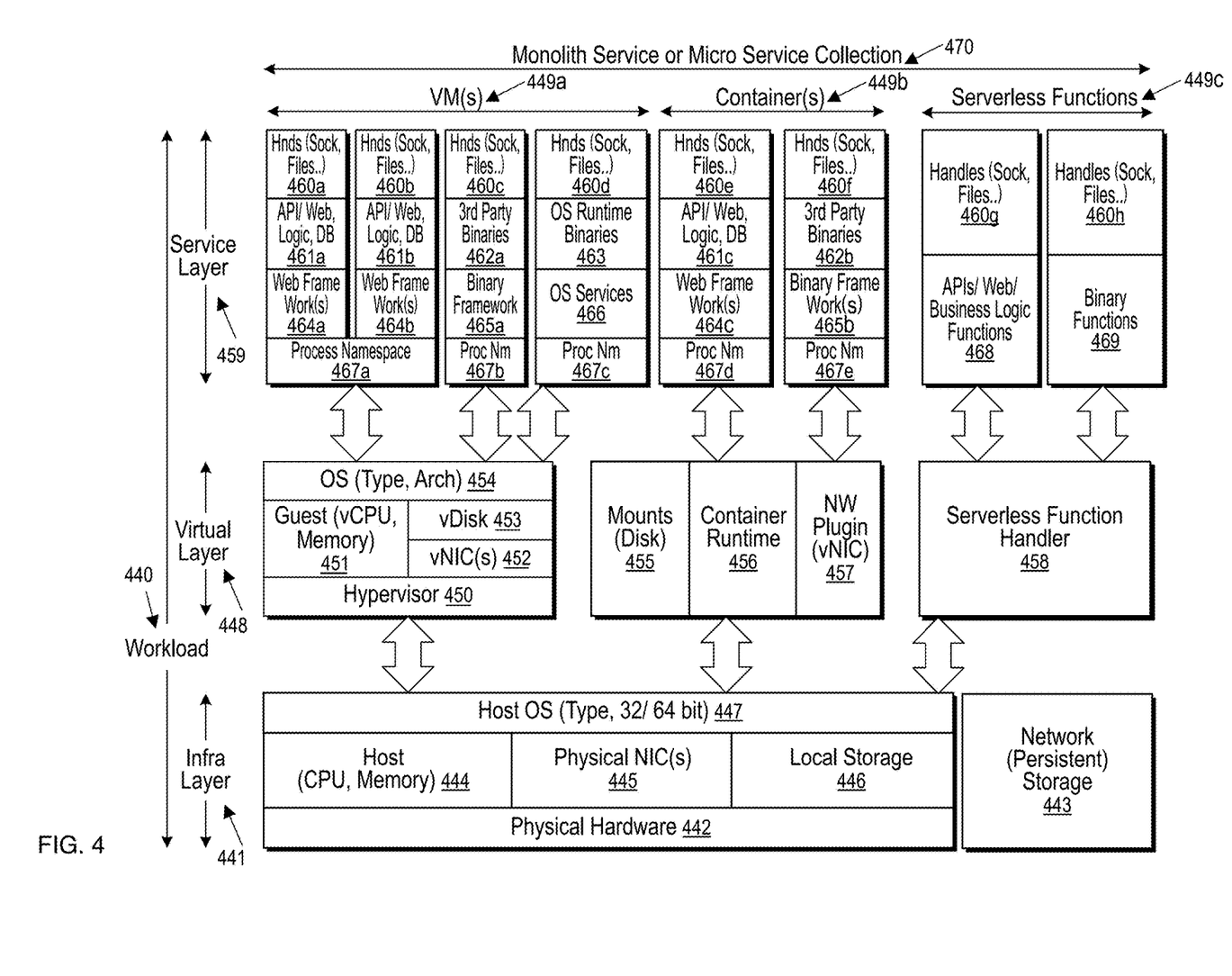
FIG. 4 is a block diagram showing an example workload subject to embodiments.

Individual workloads, e.g., the workloads 338*a*, 338*b*, 338*c*, and 338*n* are composed of three layers as shown by the example workload 440 in FIG. 4. FIG. 4 illustrates an individual workload 440 that may be deployed upon a network to enable functionality of software such as an application. Such a workload 440 includes an infrastructure layer 441, a virtualization layer 448, and a service layer 459. So configured, such a workload 440 may be referred to as an application service instance (ASI). The infrastructure layer 441 defines attributes such as compute, storage, and host OS attributes. This infrastructure layer 441 can be provided and managed by either a $1^{st}$ or $3^{rd}$ party cloud provider or a private data center provider. The ASI shown in FIG. 4 includes a collection of components comprising a monolith service or a microservice 470. Such a collection 470 includes virtual machines 449*a*, containers 449*b*, and serverless functions 449*c*. The ASI shown in FIG. 4 encompasses a workload 440 deployed on a server.

The lowest layer of the workload 440 is called the compute or infrastructure layer 441. The infrastructure layer 441 includes physical hardware 442, persistent storage 443 available on the network, a host device 444 with a processor and memory, a physical network interface card 445, local storage 446, and a host operating system 447. As such, the layer 441 is composed of not only the compute 442, memory 444, networking 445, and storage (local 446 and remote 443) components, but also the host operating system 447.

The layer in the center of the workload 440 is called the virtualization layer 448. This layer 448 allows users to specify the virtualization technology that isolates the application's business logic from the underlying infrastructure layer 441. There are three virtualization options—the virtual machine 449a, the container 449b, and the serverless option 449c.

The virtualization layer 448 may include a hypervisor 450 and a guest entity 451 that may include a virtual processor and memory. The virtual layer 448 may also include a virtual network interface card 452, a virtual disk 453, and may have an operating system 454 installed thereupon. The virtual layer 448 also includes, for container applications 449b, container mounts 455, container runtime components 456, and network plugin 457. The virtualization layer 448 may also include a serverless 449c function handler 458.

The workload's virtualization layer 448 defines attributes such as a virtualization type, which may be implemented as a bare metal instance, a virtual machine instance 449a, a container instance 449b, or a serverless function 449c. This layer 448 can be provided and managed by either the $1^{st}$ party (where the application and infrastructure are owned and operated by the same entity) or by $3^{rd}$ parties (where the application and infrastructure are owned and operated by different entities).

The top layer of the workload 440 is the service layer 459. In operation, the hypervisor 450 of the virtual layer 448 may, through the operating system 454, connect to one or more virtual machines 449a that are part of the service layer 459. Such virtual machines 449a may include handlers 460a, 460b, 460c, 460d, application programming interface (API) or web logic or databases 461a, 461b, third-party binaries 462a, operating system runtime binaries 463, web frameworks 464a, 464b, binary framework 465a, operating system services 466, and process name spaces 467a, 467b, 467c.

In embodiments operating upon software configured as containers 449b, the service layer 459 includes handlers 460e, 460f, API or web logic or database 461c, web frameworks 464c, process namespace 467d, 467e, third-party binaries 462b, and binary frameworks 465b.

In serverless configurations 449c, a serverless function handler 458 interfaces with handles 460g, 460h, respectively through APIs or web or business logic functions 468, and binary functions 469.

The service layer 459 describes the logical part of the application, implemented as the monolith or microservice collection 470, upon the workload 440. As can be seen in FIG. 4, the memory subsystem is indicated by a collection of processes 467a-e that execute code 461a-c, 462a-b, 463, 468, and 469 that may be from one or more packages or frameworks 464a-c 465a-b, 466. These frameworks could be web (or API Frameworks) 464a-c, Binary 465a-b, or OS Runtime services (aka Host Framework) 466. The processes 467a-e from the one or more frameworks 464a-c 465a-b, 466 described above not only load code, but also open handles 460a-h on non-code files such as configuration files, log files, content files etc. Processes 467a-e can also have handles open on other workloads that form part of the overall end user application.

The service layer 459 contains active code that provides the application's observable functionality. The service layer 459 can be powered by a mixture of OS and OS-provided runtime services (e.g., a host framework), one or more $1^{st}$ or $3^{rd}$ party precompiled executables and libraries (e.g., binary frameworks), and one or more $1^{st}$ or $3^{rd}$ party interpreted code files (e.g., interpreted frameworks).

Automatic and On-Demand Evaluation

In current application implementations, such as those described hereinabove in relation to FIG. 3 and FIG. 4, evaluating cyber risk entails determining the risk from individual workloads. For instance, quantifying the cyber risk for the application 331a entails aggregating the cyber risk from individual workloads 338a, 338b, 338c, and 338n. Vulnerability databases leverage a common metric called the Common Vulnerability Security Score (CVSS). A CVSS score between 9.0 and 10.0 is considered Critical. A score between 7.0 to 8.9 is considered High. A Score between 4.0 and 6.9 is considered Medium. Attacks that are conducted from remote networks are considered more lethal than attacks that are conducted from local networks because it is typically more difficult to conduct the attack from inside the enterprise for fear of being caught. Similarly, attacks that require privileges are considered harder to mount since it involves stealing a specific user's credentials.

Automatic Interpreted Application Control Policy (IACP) Generation

Figure 5:
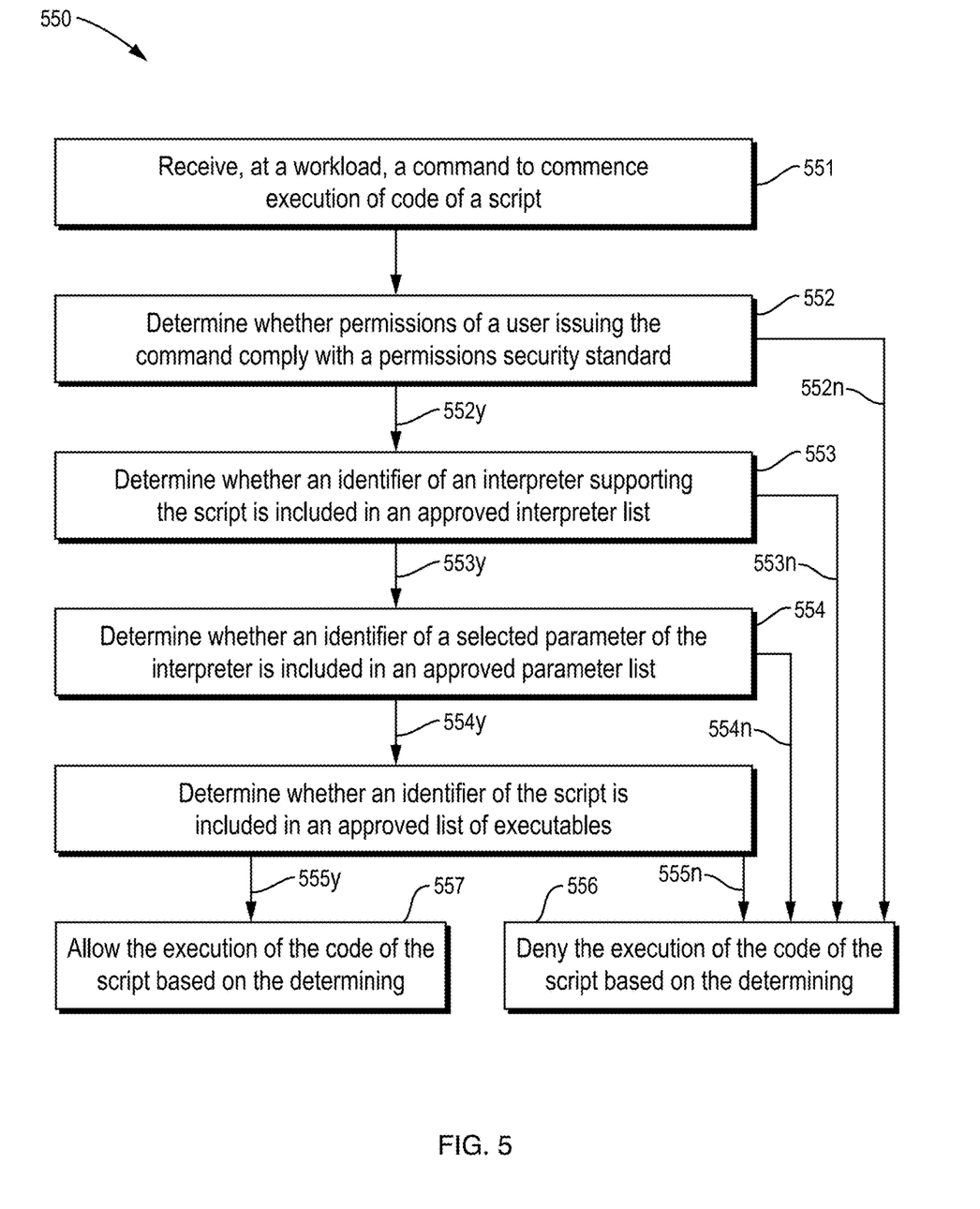
FIG. 5 is a flowchart of a method of protecting a computing workload from script-based attacks according to an embodiment.

Embodiments provide a solution that protects against script-based attacks by automatically generating and imposing a series of IACP rules. FIG. 5 is a flow diagram of a method 550 for protecting workloads against script-based attacks according to an embodiment.

The method 550 begins at step 551 with receiving, at a workload, a command to commence execution of code of a script. Such a workload may be of workloads 338a, 338b, 338c, and 338n or workload 440. The method 550 continues by determining whether permissions 552 of a user issuing the command comply with a permissions security standard. If the user permissions do not comply 552n, the method 550 terminates at step 556 by denying the execution of the code of the script based on the determining 552. If the user permissions comply with the security standard 552y, the method 550 continues by determining whether an identifier of an interpreter 553 supporting the script is included in an approved interpreter list. Such an identifier may be, for example, a hash or a checksum of the interpreter. If a match is not found 553n, the method 550 terminates at step 556 by denying the execution of the code of the script based on the determining 553. If a match is found 553y, the method 550 continues by determining whether an identifier of a selected parameter of the interpreter 554 is included in an approved parameter list. Such an identifier may be, for example, a hash or a checksum of the parameter. If a match is not found 554n, the method 550 terminates at step 556 by denying the execution of the code of the script based on the determining 554. If a match is found 554y, the method 550 continues by determining whether an identifier of the script 555 is included in an approved list of executables. If a match is not found 555n, the method 550 terminates at step 556 by denying the execution of the code of the script based on the determining 555. If a match is found 555y, the method 550 terminates at step 557 by allowing the execution of the code of the script based on the determining 552, 553, 554, 555.

It is noted that while FIG. 5 illustrates step 552 being followed by step 553, step 553 being followed by step 554, and step 554 being followed by step 555, embodiments are not so limited. In particular, the determinations 552-555 may be made in any order and contemporaneously.

The following sections describe several sets of IACP polices and rules that may be employed by embodiments to protect a workload from being attacked. When a new script-based process is about to be spawned, the command line for said process is compared against a series of IACP policies and sub-rules thereof. The underlying IACP rules can result in the process being denied further execution, or in the process being permitted to complete execution. Those IACP Policy and Rules that cause process spawning to be denied are described first, followed by the rules that allow the process spawn to continue.

File Integrity Match Allow Policy and Rules

Developers often add scripts into released compiled software packages, such as RPM Package Manager (RPM) packages, Windows Installer (MSI) packages, self-extracting archive (SEA) packages, TAR packages, etc. Some developers also release source code packages that a user can configure for their use case before the objects are compiled on the user's machine. The process of compilation may result in some additional scripts that can be run on the user's machine. These scripts may be considered "authorized" by embodiments unless specifically blocked by the user. An embodiment extracts all scripts, statically and dynamically, that are produced after source code compilation. Inherently, this policy is an allow policy. In an example embodiment, an identifier of such an authorized script may be determined 554 to be in an approved list of scripts according to the method 550. Alternatively, an identifier of an executable containing such an authorized script may be determined 553 to be in an approved list of executables according to the method 550.

Hardened Deny Policy and Rules

Even if code from a package is present on a workload, it may not be needed (i.e., loaded and executed) at run time. Static and dynamic scripts from packages that are not used at runtime can be hardened out by embodiments. Inherently, this policy is a deny policy.

User Mismatch Deny Policy and Rules

Since scripts require an interpreter to be running, it may be difficult for a developer to determine what access privileges should be assigned to the scripts the developer packs into their source or object code. To overcome this issue, developers often allow their script to be executed by any user rather than only by the user the developer originally intended to execute the script. This mismatch allows an interpreter executable to run the script with the privileges of any user.

An embodiment of the method 550 ensures that the interpreter runs with only those privileges with which the parent process also runs 552. Any attempt to change the privilege level may trigger the process spawned by the interpreter to be blocked according to the IACP. Inherently this policy is a deny policy.

IT Support Allow Policy and Rules

Information technology (IT) personnel of an enterprise may have special scripts with specified access privileges that they may wish to execute from time to time. These scripts may be used, for example, for maintenance purposes, and may be executed when a workload is found to be in a maintenance window, i.e., a period of time in which maintenance may be performed with minimized disruption to hosted services. Embodiments may enable IT personnel acting as an enterprise change control administrator to add specific policies. This IACP policy is an "allow" policy by nature. In an example embodiment of the method 550, allowing or denying execution of the code of the script is thus based on permissions associated with a user requesting the execution of the code of the script.

Known Attacker Tactics, Techniques, and Procedures (TTP) Deny Policy and Rules

Attack frameworks, such as MITRE's ATT&CK framework referenced hereinabove, specify common techniques used by attackers to perpetuate a kill chain. This policy checks child processes against known attacker techniques, such as establishment of a reverse channel. This policy is inherently a deny policy.

Known Executable Vulnerability Deny Policy and Rules

From time to time, a vulnerability is disclosed in a named application, wherein if the executable is executed with specified parameters, an attacker can gain control of the application and execute arbitrary software. An embodiment leverages functionality described in U.S. Provisional Application No. 63/190,100 (introduced and incorporated by reference hereinabove). Such functionality can associate packages installed on a workload with corresponding vulnerabilities. This detail is stored in a local third-party vulnerability database (LTPCVDB). Embodiments prevent the named application from being invoked if such vulnerabilities are discovered. This policy is inherently a deny policy.

Known Library Vulnerability Deny Policy and Rules

From time to time, a vulnerability is disclosed in a named library wherein if the executable loads said library, an attacker can gain control of the application and execute arbitrary software. An embodiment leverages functionality described in U.S. Provisional Application No. 63/190,100 (introduced and incorporated by reference hereinabove). Such functionality can associate packages installed on a workload with corresponding vulnerabilities. This detail is stored in a local third-party vulnerability database (LTPCVDB). Embodiments prevent the named library from being loaded if such vulnerabilities are discovered. This policy is inherently a deny policy.

Figure 6:
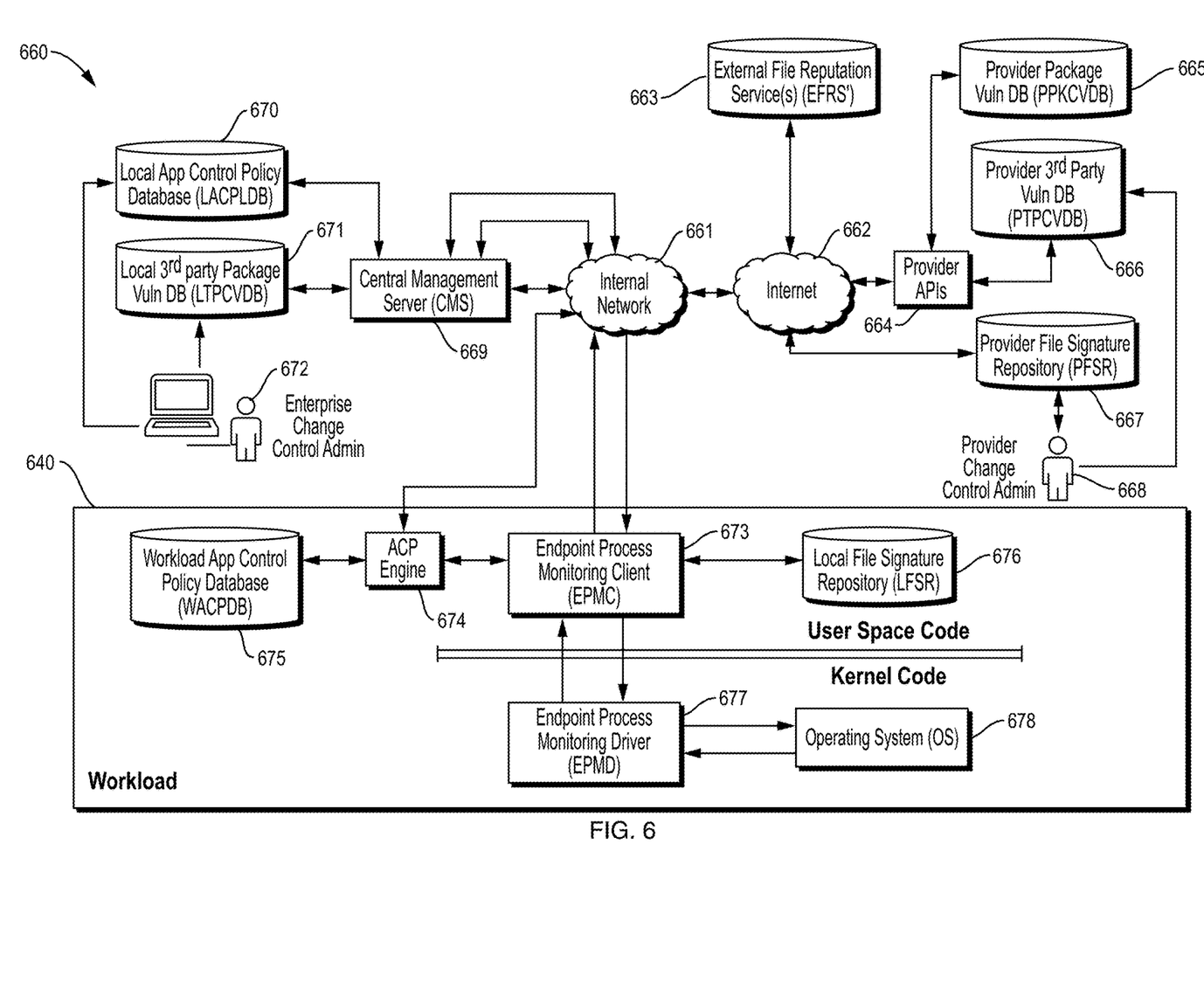
FIG. 6 is a simplified block diagram of a system for protecting a computing workload from script-based attacks according to an embodiment.

FIG. 6 is a schematic block diagram of a system 660 for protecting a computing workload from script-based attacks, according to embodiments. The system 660 operates across an internal network 661 of an enterprise, and also connects to various remote entities via the Internet 662. Such remote entities include an external file reputation service (EFRS) 663, a provider package common vulnerability database (PPKCVDB) 665, a provider $3^{rd}$ party common vulnerability database (PTPCVDB) 666, and a provider file signature repository (PFSR) 668. The PPKCVDB 665 and the PTPCVDB 666 may connect via provider APIs 664. The PTPCVDB 666 and the PFSR 667 may be controlled by a provider change control administrator 668.

Continuing with respect to FIG. 6, locally to the enterprise, internal network 661 may connect to a central management server (CMS) 669, which, in turn, may connect to a local application control policy database (LACPLDB) 670 and a local $3^{rd}$ party package common vulnerability database (LTPCVDB) 671. The LACPLDB and the LTPCVDB may be controlled by an enterprise change control administrator 672.

The aforementioned supporting elements of system 660 may function to protect a workload 640 from script-based attacks as described herein. The workload 640 may include an endpoint process monitoring client (EPMC) 673 and an application control policy (ACP) engine 674. The ACP engine 674 may reference a workload application control policy database (WACPDB) 675, and the EPMC 673 may reference a local file signature repository (LFSR) 676. The EPMC may be controlled by an endpoint process monitoring driver (EPMD) 677 installed upon an operating system (OS) 678 of the workload 640.

Intercepting Process Spawn and Library Load Events

The EPMC 673 of FIG. 6 can intercept process spawn and library load events. The ACP engine 674 receives a notification of such interception from the EPMC 673 and performs further processing as specified below. Processes whose spawn events can be intercepted may be the processes known beforehand, by embodiments, as processes to be spawned, and as such may be subject to an examination of permissions thereof to ensure that such permissions match those of a parent process thereof. Alternatively, processes whose spawn events can be intercepted may be other processes not otherwise anticipated by embodiments.

ACP Engine

When a new process is spawned, or a library load event occurs, the ACP engine 674 tokenizes the command line in case the event is a process spawn event. Next, the ACP engine 674 examines the tokenized command line context against the various IACP policies discussed above and saved in the WACPDB 675. Based on the policy disposition, the ACP engine 674 returns an allow/deny decision to the EPMC 673.

For library load events, the ACP engine 674 checks if a specified library has a vulnerability, and if the user has permitted the application to continue with the vulnerability. If the user has not indicated a decision (as can happen in a first instance), the ACP engine 674 may suspend the process. In return, the customer may allow the library to load within a context of a given executable. In that case, the customer's decision is conveyed to the WACPDB 675 by toggling a state flag for a combination of the given executable and the specified library. If the state flag has been turned on, then, in the future, an instance of the specified library loading into the given executable will not be blocked.

In an example embodiment, the system 660 includes the EPMC 673 configured to intercept a command to commence execution of code of a script. In the example, the system 660 further includes the ACP engine 674 configured to determine, in response to the interception, whether permissions of a process to be spawned by the script match permissions of a parent process of the script, an identifier (e.g., a hash) of an executable containing the script is included in an approved list of executables, and an identifier (e.g., a hash) of the script is included in an approved list of scripts. The ACP engine 674 may be further configured to allow or deny the execution of the code of the script based on the determining, thereby protecting the workload from script-based attacks.

Advantages

Embodiments have numerous advantages over existing methods for protecting computing workloads. Unlike conventional protection schemes, embodiments can automatically determine and restrict the executables, libraries, and scripts that can load in memory. This not only prevents valid executables, libraries, and scripts from loading in an unauthorized manner, but also prevents malware from loading and executing even one instruction.

Conventional solutions for executable-based attacks fail to prevent attackers from launching processes with permissions that differ from parent processes thereof, indicating that it was not, in fact, the parent process that launched the process, but likely an attacker. Embodiments can automatically prevent privilege escalation attacks by ensuring a child process runs with the same privileges as the corresponding parent process, unless specifically approved by an administrator, e.g., a change control administrator. Nevertheless, embodiments allow an enterprise's information technology support personnel to add scripts into the allowed list as they see fit.

Additionally, embodiments advantageously disable standards-based known attack techniques, e.g., MITRE's ATT&CK Framework. Embodiments may also disable executables or libraries from being used in a way that a known vulnerability in the executable or library can be exploited.

Computer Support

Figure 7:
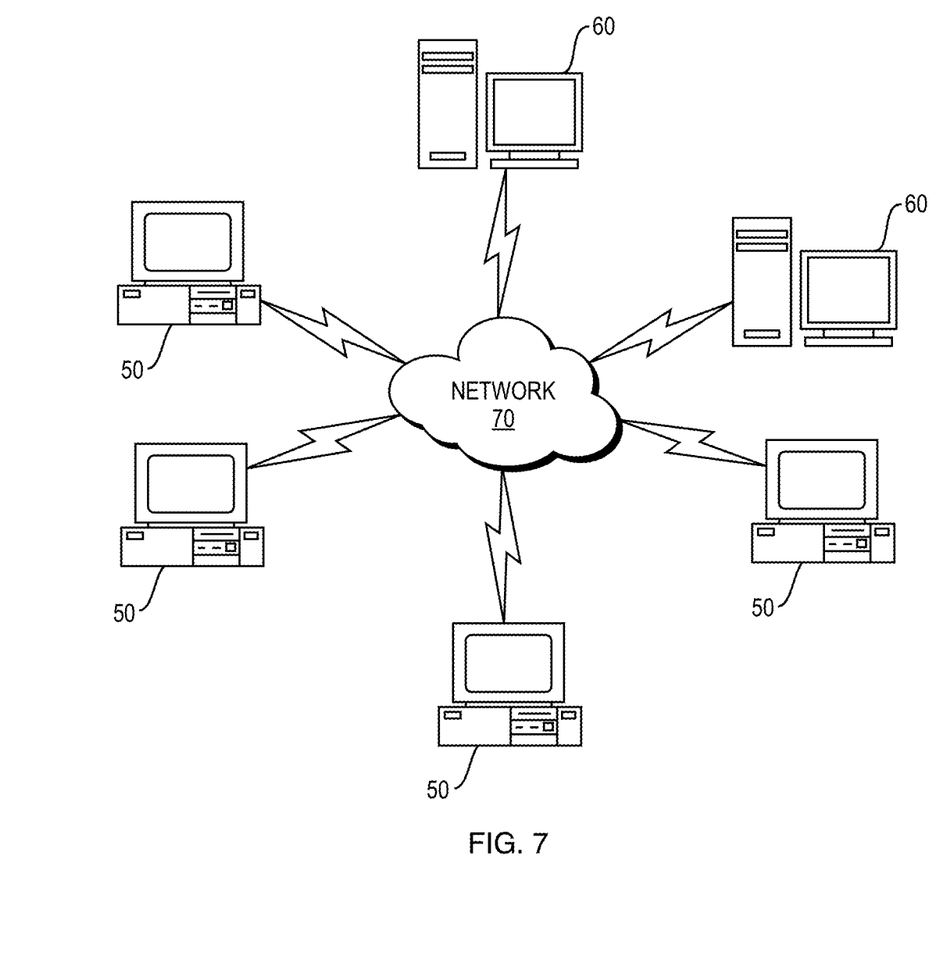
FIG. 7 illustrates a computer network or similar digital processing environment in which embodiments may be implemented.

FIG. 7 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 and/or servers 60 may be configured, alone or in combination, to implement the embodiments described herein, e.g., the method 550, amongst other examples. The server computers 60 may not be separate server computers but part of cloud network 70.

Figure 8:
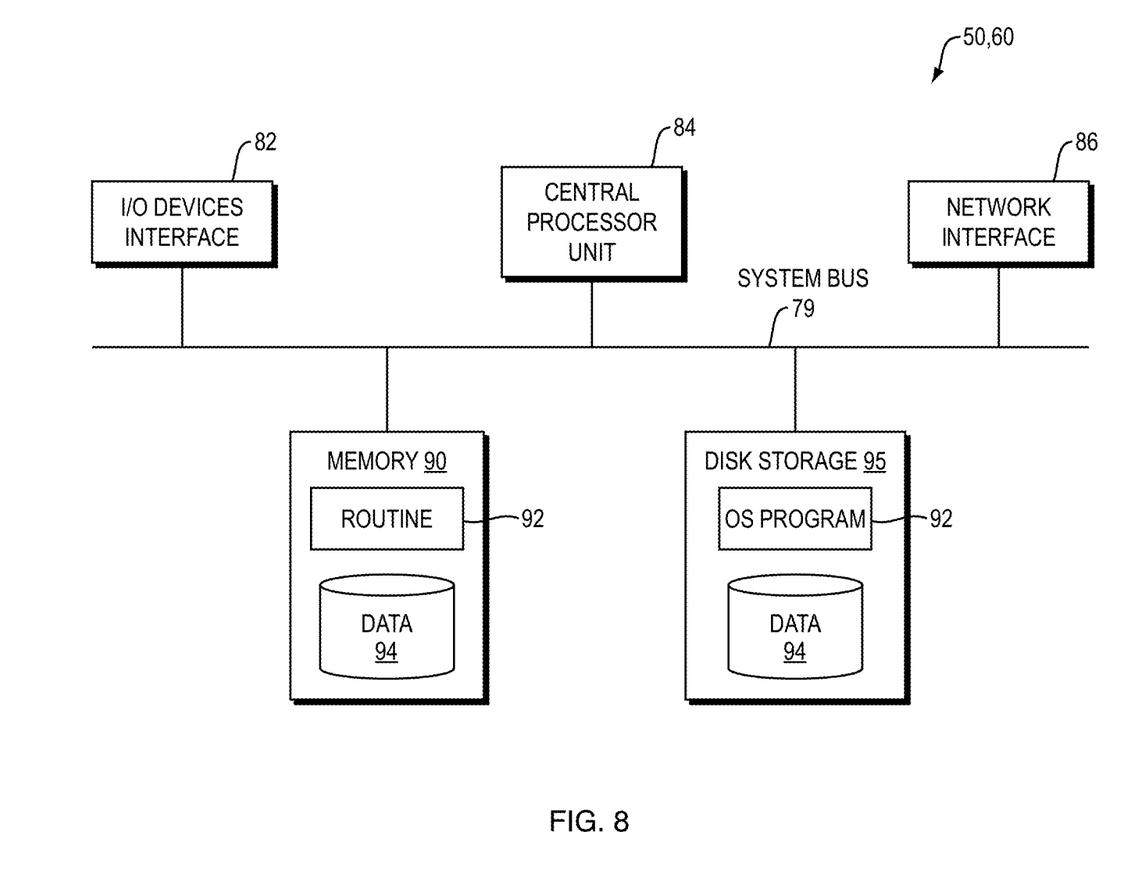
FIG. 8 is a diagram illustrating an example internal structure of a computer in the environment of FIG. 7.

FIG. 8 is a diagram of an example internal structure of a computer (e.g., client processor/device 50 or server computers 60) in the computer system of FIG. 7. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an input/output (I/O) device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 7). Memory 90 provides volatile storage for computer software instructions 92 and data 94 used to implement an embodiment of the present disclosure (e.g., the method 550, amongst others). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware including but not limited to hardware circuitry, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, hardware, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of protecting a computing workload from script-based attacks, the method comprising:
   receiving, at a workload, a command to commence execution of code of a script;
   determining whether:
      (i) permissions of a user issuing the command comply with a permissions security standard;
      (ii) an identifier of an interpreter supporting the script is included in an approved interpreter list;
      (iii) an identifier of a selected parameter of the interpreter is included in an approved parameter list, wherein the selected parameter modifies operations performed by the interpreter and the identifier of the selected parameter is distinct from the identifier of the interpreter; and
      (iv) an identifier of the script is included in an approved list of executables; and
   allowing or denying the execution of the code of the script based on the determining, thereby protecting the workload from script-based attacks.

2. The method of claim 1 wherein at least one of the identifier of the interpreter, the identifier of the selected parameter, and the identifier of the script, includes a checksum.

3. The method of claim 1 further comprising:
   receiving an identifier of an approved interpreter, or parameter thereof, from a vendor of the approved interpreter; and
   adding the identifier of the approved interpreter, or parameter thereof, to the approved interpreter list, or the approved parameter list.

4. The method of claim 1 further comprising:
   receiving an identifier of an approved script from a vendor of the approved script; and
   adding the identifier of the approved script to the approved list of executables.

5. The method of claim 1 wherein allowing or denying the execution of the code of the script further comprises:
   denying the execution of the code of the script in response to the received command not being present in a list of commands known to be used by the workload at runtime.

6. The method of claim 1 wherein allowing or denying the execution of the code of the script is further based on determining whether the user is positively authorized to execute the script based on permissions of the user and permissions of the script.

7. The method of claim 1 wherein allowing or denying the execution of the code of the script further comprises:
   denying the execution of the code of the script in response to a process to be spawned by the script matching a process in a list of known malicious processes.

8. The method of claim 1 wherein allowing or denying the execution of the code of the script further comprises:
   denying the execution of the code of the script in response to at least one of the script, a process to be spawned by the script and a library to be loaded during the execution of the script, including a known vulnerability.

9. The method of claim 1 further comprising, in response to allowing the execution of the code of the script:
   intercepting a given process spawned during the execution of the code of the script;
   tokenizing the received command;
   comparing tokens of the tokenized received command with entries in an allow-list database; and
   based on the comparing, maintaining the execution, or suspending the execution, of the code of the script, or indicating a result of the comparing to a user seeking to control execution of the script.

10. The method of claim 1 further comprising, in response to allowing the execution of the code of the script:
    intercepting a library loaded during the execution of the script; and
    in response to the library including a known vulnerability, and a disposition of the library regarding the vulnerability having not been received from a user, suspending the execution of the code of the script, or indicating the vulnerability to a user seeking to control execution of the script.

11. A system for protecting a computing workload from script-based attacks, the system comprising:
    an application control policy (ACP) engine and an endpoint process monitoring client (EPMC); wherein
    the EPMC is configured to intercept a command to commence execution of code of a script at a workload;
    the ACP engine is configured to determine, in response to the interception of the command by the EPMC, whether:
       (i) permissions of a user issuing the command comply with a permissions security standard;
       (ii) an identifier of an interpreter supporting the script is included in an approved interpreter list;
       (iii) an identifier of a selected parameter of the interpreter is included in an approved parameter list, wherein the selected parameter modifies operations performed by the interpreter and the identifier of the selected parameter is distinct from the identifier of the interpreter; and
       (iv) an identifier of the script is included in an approved list of executables; and
    the ACP engine is configured to allow or deny the execution of the code of the script based on the determining, thereby protecting the workload from script-based attacks.

12. The system of claim 11 wherein at least one of the identifier of the interpreter, the identifier of the selected parameter, and the identifier of the script, includes a checksum.

13. The system of claim 11 wherein at least one of the EPMC and the APC engine, is further configured to:
   receive an identifier of an approved interpreter, or parameter thereof, from a vendor of the approved interpreter; and
   add the identifier of the approved interpreter, or parameter thereof, to the approved interpreter list, or the approved parameter list.

14. The system of claim 11 wherein at least one of the EPMC and the APC engine, is further configured to:
   receive an identifier of an approved script from a vendor of the approved script; and
   add the identifier of the approved script to the approved list of executables.

15. The system of claim 11 wherein allowing or denying execution of the code of the script includes:
   denying the execution of the code of the script in response to the intercepted command not being present in a list of commands known to be used by the workload at runtime.

16. The system of claim 11 wherein allowing or denying execution of the code of the script includes:
   denying the execution of the code of the script in response to a process to be spawned by the script matching a process in a list of known malicious processes.

17. The system of claim 11 wherein allowing or denying execution of the code of the script includes:
   denying the execution of the code of the script in response to at least one of the script, a process to be spawned by the script, and a library to be loaded during the execution of the script, including a known vulnerability.

18. The system of claim 11 wherein:
   the EPMC, in response to the execution of the code of the script, is configured to intercept a given process spawned during the execution of the code of the script; and
   the ACP engine is configured to:
      (i) tokenize the received command;
      (ii) compare tokens of the tokenized received command with entries in an allow-list database; and
      (iii) based on the comparing, maintain the execution, or suspend the execution, of the code of the script, or indicate a result of the comparing to a user seeking to control execution of the script.

19. The system of claim 11 wherein:
   the EPMC, in response to allowing the execution of the code of the script, is configured to intercept a library loaded during the execution of the script; and
   the ACP engine, in response to (i) the library including a known vulnerability, and (ii) a disposition of the library regarding the vulnerability having not been received from a user, is configured to suspend the execution of the code of the script, or to indicate the vulnerability to a user seeking to control execution of the script.

20. A computer program product for protecting a computing workload from script-based attacks, the computer program product comprising:
   one or more non-transitory computer-readable storage devices and program instructions stored on at least one of the one or more storage devices, the program instructions, when loaded and executed by a processor, cause the processor to:
   receive, at a workload, a command to commence execution of code of a script;
   determine whether:
      (i) permissions of a user issuing the command comply with a permissions security standard;
      (ii) an identifier of an interpreter supporting the script is included in an approved interpreter list;
      (iii) a selected parameter of the interpreter is included in an approved parameter list, wherein the selected parameter modifies operations performed by the interpreter and the identifier of the selected parameter is distinct from the identifier of the interpreter; and
      (iv) an identifier of the script is included in an approved list of executables; and
   allow or deny the execution of the code of the script based on the determining, thereby protecting the workload from script-based attacks.

* * * * *